(12) United States Patent
Peistrup et al.

(10) Patent No.: US 6,438,950 B1
(45) Date of Patent: Aug. 27, 2002

(54) HYDRAULIC STEERING ARRANGEMENT

(75) Inventors: Peter Gade Peistrup; John Børsting Jensen, both of Nordborg; John Kristensen, Sønderborg, all of (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 09/402,580

(22) PCT Filed: Apr. 6, 1998

(86) PCT No.: PCT/DK98/00138

§ 371 (c)(1),
(2), (4) Date: Oct. 6, 1999

(87) PCT Pub. No.: WO98/45155

PCT Pub. Date: Oct. 15, 1998

(30) Foreign Application Priority Data

Apr. 10, 1997 (DE) .......................... 197 14 785

(51) Int. Cl.[7] ............................. F16D 31/02
(52) U.S. Cl. ........................... 60/385; 60/386
(58) Field of Search .................. 60/384, 385, 386

(56) References Cited

U.S. PATENT DOCUMENTS

| | | | | |
|---|---|---|---|---|
| 3,223,382 A | * | 12/1965 | Mercier et al. | ............... 60/385 |
| 4,023,363 A | * | 5/1977 | Liebert | .......................... 60/385 |
| 4,311,006 A | * | 1/1982 | Becker | .......................... 60/385 |
| 4,405,030 A | * | 9/1983 | Wittren | .................. 180/153 X |
| 4,553,390 A | * | 11/1985 | Liebert et al. | ................. 60/384 |
| 4,781,262 A | * | 11/1988 | Nakamura et al. | ......... 60/386 X |
| 5,497,692 A | * | 3/1996 | Marcott | ..................... 60/385 X |

FOREIGN PATENT DOCUMENTS

DE 3732662 * 4/1989

* cited by examiner

*Primary Examiner*—Hoang Nguyen
(74) *Attorney, Agent, or Firm*—Lee, Mann, Smith, McWilliams, Sweeney & Ohlson

(57) ABSTRACT

Hydraulic steering arrangement (15) with a steering handwheel (2), which is connected with a manual. pump (3), a pump (18) supplying hydraulic fluid, a steering motor (12) and a steering valve (15) arranged between pump (18) and steering motor (12) and having a valve element (20) steering the flow of hydraulic fluid between the pump (18) and the steering motor (12), the valve element (20) being displaceable by hydraulic pressures originating from the manual pump. In such a steering arrangement it is wanted to create the opportunity of implementing various functions, without having to abandon the ordinary hydraulic control. For this purpose, the valve element (20) has an additional drive (31).

13 Claims, 3 Drawing Sheets

HYDRAULIC STEERING ARRANGEMENT

Figure 1:
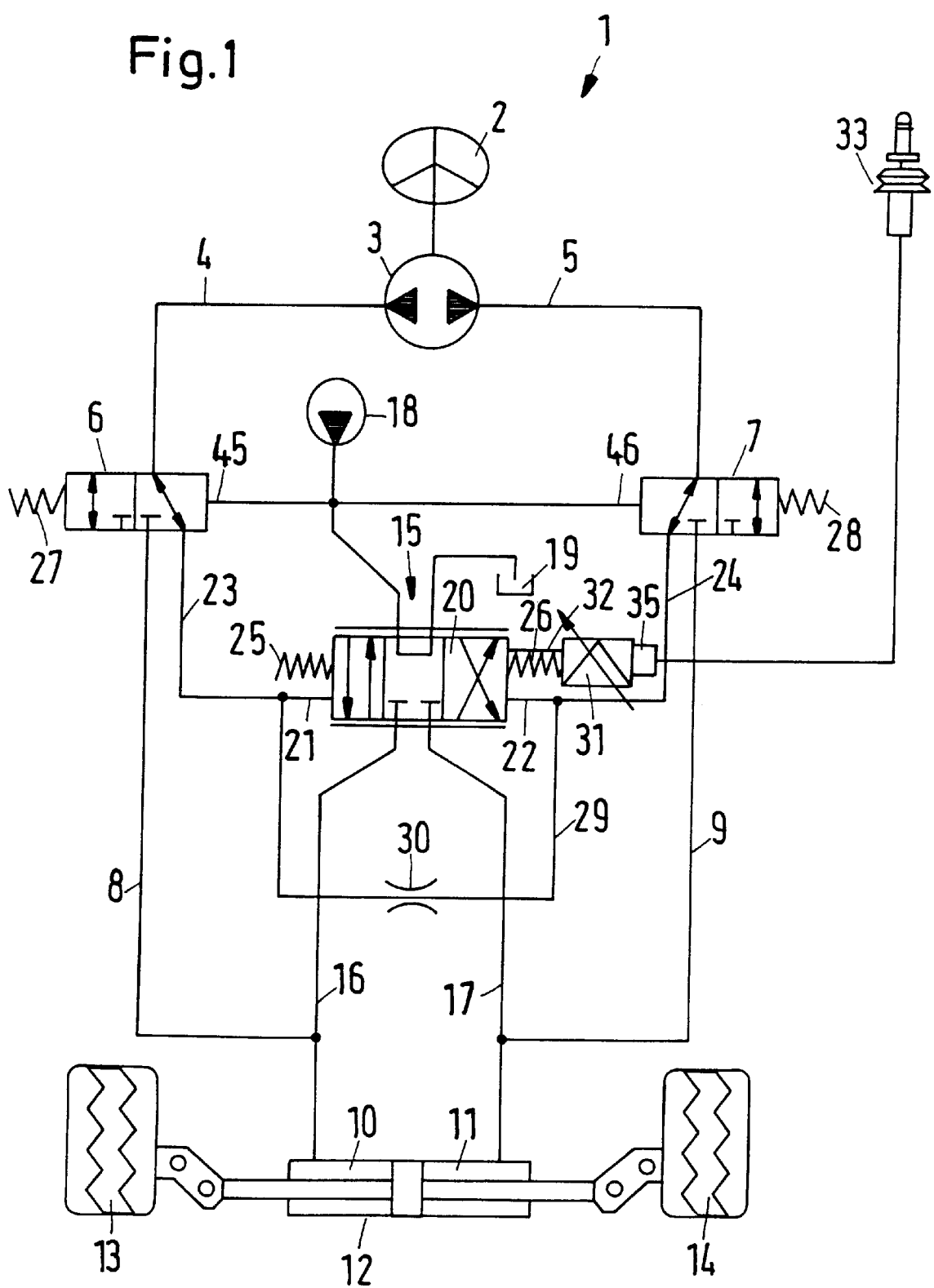

The invention concerns a hydraulic steering arrangement with a steering handwheel which is connected with a manual pump, with a pump supplying hydraulic fluid, a steering motor and a steering valve arranged between pump and steering motor and having a valve element controlling the flow of hydraulic fluid between the pump and the steering motor, the valve element being displaceable by hydraulic energy originating from the manual pump.

Such a steering arrangement is known from for example DE 25 57 373 A1. The principle is not to use the amount of hydraulic fluid supplied during normal operation by the manual pump connected with the steering handwheel for direct operation of the steering motor, but only to displace a valve element, in this case a steering slide, of the steering valve. The steering slide then provides a connection between the pump, operated for example by the motor of the steered vehicle, and the steering motor, so that the steering motor is provided with hydraulic fluid originating from the pump. This is a reliable way of producing a steering with auxiliary power support.

In many cases, however, not only operation of the vehicle with the steering handwheel but also additional steering opportunities are wanted, for example from a second driver's cabin or by means of a remote control. A revision of the "steering orders" given by the steering handwheel is often also wanted, for example to improve the steering comfort of the vehicle. In vehicles with articulated steering, for example, it is advantageous to reduce the steering speed or steering acceleration to a certain value to avoid uncomfortable acceleration forces on the driver.

This can for example be realised in that, like in U.S. Pat. No. 4,955,445, a different sort of valve steering is used, namely an electrical steering. However, the disadvantage of this is that an additional error possibility occurs. Not only can the hydraulic circuit fail, but errors can also appear in the switching arrangement required for the displacement of the valve slide.

It is the task of the invention to provide a steering arrangement with additional functions without having to give up a hydraulic control.

In a hydraulic steering arrangement as mentioned in the introduction, this task is solved in that the valve element has an additional drive.

With this embodiment, the valve element can on one side be hydraulically controlled, when it is operated by the pressure of the manual pump. On the other side, however, it can also be displaced in a different way, namely by the additional drive mentioned. Also when the control opportunities for the additional drive fail, the normal function of the steering arrangement is maintained. The pressures produced by the manual pump on turning the steering handwheel can still act on the valve element. Thus, no additional steering valves are required to be connected parallel to the original steering valve to implement the wanted steering opportunities. On the contrary, a simple extension of the known steering valve by an additional drive for the valve element will cause an extension of the functions. The fact that no additional valves are required will save both space and costs. Further, such a steering arrangement will increase the steering comfort, as it is no longer necessary to balance several valves in relation to each other. The failure rate will be reduced accordingly.

In a preferred embodiment, the additional drive is electrically controllable. Many additional functions can be transmitted to the steering valve by electrical signals. The fact that the additional drive is electrically controllable makes it easy to process this information.

It is particularly preferred that the additional drive works electrohydraulically. The force provided by the additional drive is not, or not only, produced electrically. On the contrary, the electrical signals serve the purpose of controlling hydraulic pressures so that the wanted movement of the valve element occurs. However, these hydraulic pressures are available from the pump anyway. These pressures can for example be controlled via solenoid valves working in timed sequence, which enables the use of simpler solenoid valves. In practice, they must only be able to assume an open and a closed state. The pressures are then adjusted via the duty ratio.

Preferably, the pressures of the manual pump exert larger forces on the valve element than the additional drive. This means that the activation of the steering valve via the steering handwheel will always have preference over the activation through the additional drive, even though, if required, a movement of the valve element by means of the manual pump can override an additional movement. In practice this can be realised in that the activation pressure of the additional drive is kept relatively small.

Advantageously, the additional drive is connected with a control arrangement, which is connected with an external controller. This controller could for example be a control column or a joystick. With this control column the control arrangement can be told how the steering arrangement must work. The controller can also consist of a transmitting and a receiving unit, so that, if wanted, the steering arrangement can also be remote-controlled. The controller can also be a sensor sensing a trace in the track, so that the vehicle can also drive without a driver.

It is also advantageous to connect the steering arrangement with a sensor monitoring a variable size of the steering arrangement. Such a sensor can for example be used for the failure monitoring. Thus it can register, if the steering motor is displaced, also when a signal is not available, or if it is displaced sufficiently, when a signal is applied. By means of the sensor it is possible for example to deactivate the additional drive, if the travel gets to long. Also accelerations can be measured, in order to reduce uncomfortable loads on the driver, for example in connection with articulated vehicles.

Preferably, the sensor is a steering handwheel sensor. The steering handwheel sensor can for example monitor the rotation speed of the steering handwheel. To keep the transversal acceleration in connection with the steering of the vehicle within predetermined limits, the additional drive can then act against the pressures of the manual pump on the valve element, so that less hydraulic fluid than ordered by the driver by means of the steering handwheel reaches the steering motor from the pump. In fact, however, a random transfer function between the movement of the steering handwheel and the movement of the steering motor can also be produced. If wanted, this transfer function can also be changed in dependence of the speed.

In a preferred embodiment, the manual pump is arranged in a circuit with an orifice arrangement with at least one orifice, the orifice arrangement being connected with actuating connections of the steering valve and arranged parallel to the steering valve. The hydraulic fluid supplied by the pump thus flows in a closed circuit, when the steering handwheel is operated. In this circuit one or more orifices are arranged, which then produce a pressure drop between the two actuating connections of the steering valve. This pressure drop produces a pressure difference over the valve element, which is then used for actuating the valve element, that is for example for displacing a valve slide. This is advantageous in that the actuation of the valve element only takes place as long as the steering handwheel is operated. As soon as the steering handwheel is no longer turned, hydraulic fluid supply stops, and accordingly the orifice produces no pressure drop. The steering valve then returns to its neutral position, and the steering motor displaced during the operation of the steering handwheel remains in its displaced position. Thus the driver will have to deliberately turn back the steering handwheel to bring the wheels to the neutral position. On the other hand, however, the orifice also involves the advantage that a "short-circuit path" is available on operating the additional drive, through which path the hydraulic fluid displaced from one side of the valve element can flow back to the other side of the valve element, without risking that such a movement is blocked by the manual pump. This could for example be the case, when the steering handwheel is blocked and no fluid can flow through the manual pump.

Preferably, the orifice has an adjustable size. Thus the flow resistance and the pressure drop, which can be generated at the orifice, can be adjusted. The advantage is that the same steering arrangement can be used for different vehicles. The "transmission ratio" between steering handwheel rotations and the point of impact of the steered vehicle wheels, or the articulation of the vehicle when articulated vehicles are concerned, can be adjusted by changing the orifice size. The orifice size can also be adjusted in dependence of the operating conditions. For example difficult ground often requires a different steering behaviour than normal road driving. If wanted, the adjustment of the orifice size can be speed dependent.

Preferably, a throttle is provided in the flow path between pump and steering motor, and the orifice is controlled so that the relation between the pressure drops over orifice and throttle follow a predetermined function. Thus, in principle, a flow amplifier can be realised. The relation then states the amplification factor with which the valve element is actuated in dependence of the movement of the steering handwheel. The relation can also be variable, so that further parameters, such as vehicle speed, ground properties, load etc., can influence the relation. It is also possible that the flow through the orifice is a predetermined function of the flow through the throttle.

In a particularly preferred embodiment, however, the relation is constant. Thus, pilot flow and steering flow must be proportional to each other, in order that a constant amplification factor can be obtained. Correspondingly, the valve element is only displaced by a certain distance depending on the steering handwheel speed.

Preferably, an additional valve arrangement is arranged between the manual pump and the steering valve, which connects the manual pump with either the steering valve or, when the pump pressure drops below a predetermined value, with the steering motor. This additional valve arrangement provides a safety measure, so that the steering arrangement is kept operational, also on pump failure resulting in a drop of the pump pressure. The steering motor is then operated direct via the steering handwheel. By way of the additional valve arrangement the steering valve is disconnected in this embodiment, so that here no additional resistances are produced, which could make the steering using the manual pump as emergency pump more difficult.

It is preferred that the additional valve arrangement has an additional valve element arrangement, whose steering inlet is connected with the outlet of the pump. Thus the steering inlet of the additional valve arrangement is always loaded with the pump pressure. The pump pressure can then always be used to position the additional valve element arrangement so that the manual pump is connected with the control inlets of the steering valve. In the opposite direction the additional valve element arrangement is then loaded by a counterforce, for example a spring. When now the pump pressure drops, the steering inlet no longer gets the required pressure, so that the additional valve element arrangement is displaced to its other position and the additional valve arrangement connects the manual pump direct with the steering motor.

Preferably, the additional valve arrangement has an additional valve on both sides of the manual pump. Of course, both additional valves can also be arranged in a housing. However, this gives a symmetric steering of the steering valve, meaning that in case of failure, that is a drop in the pump pressure, both sides of the manual pump are connected direct with the steering motor.

Figure 2:
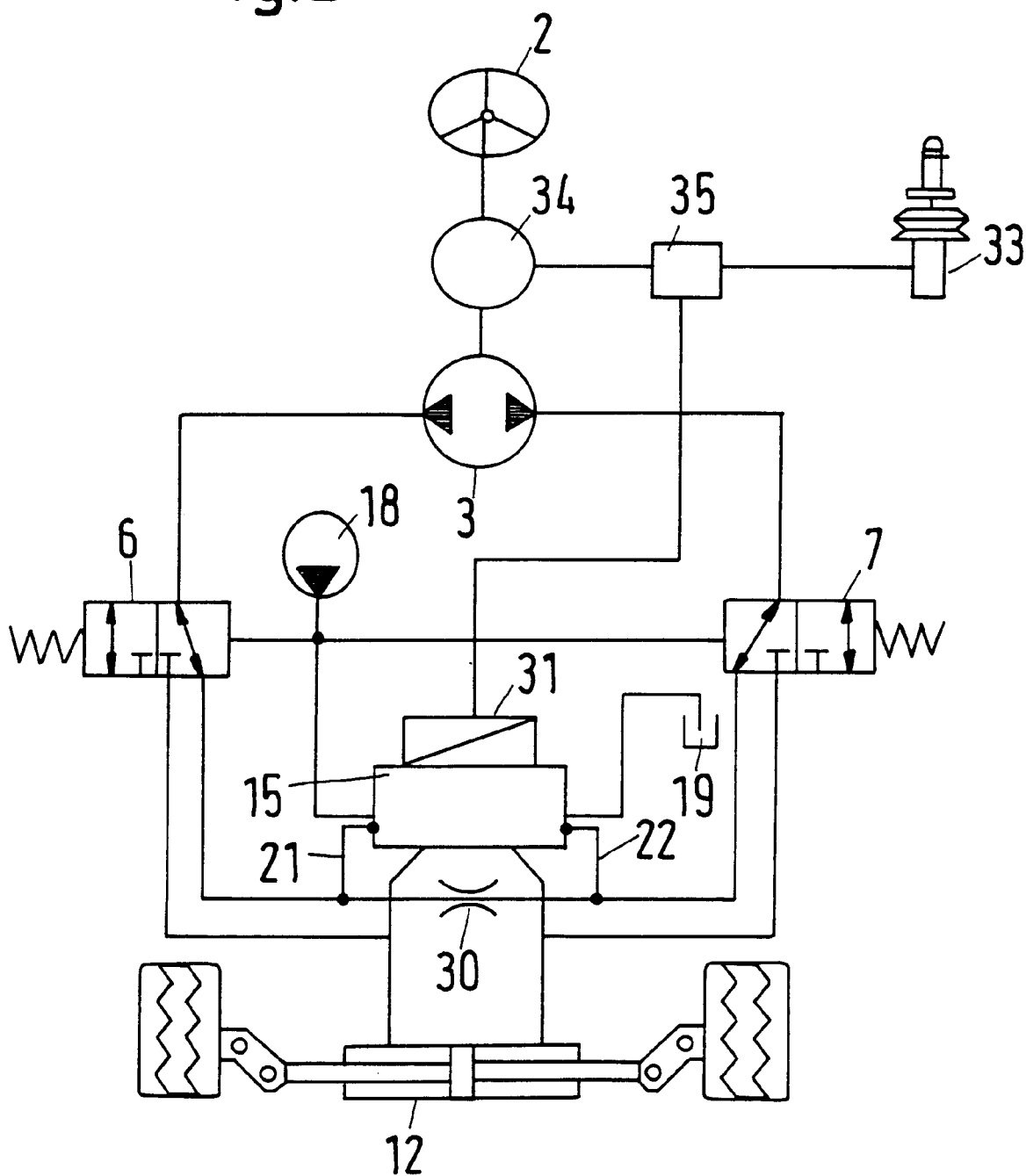
Figure 3:
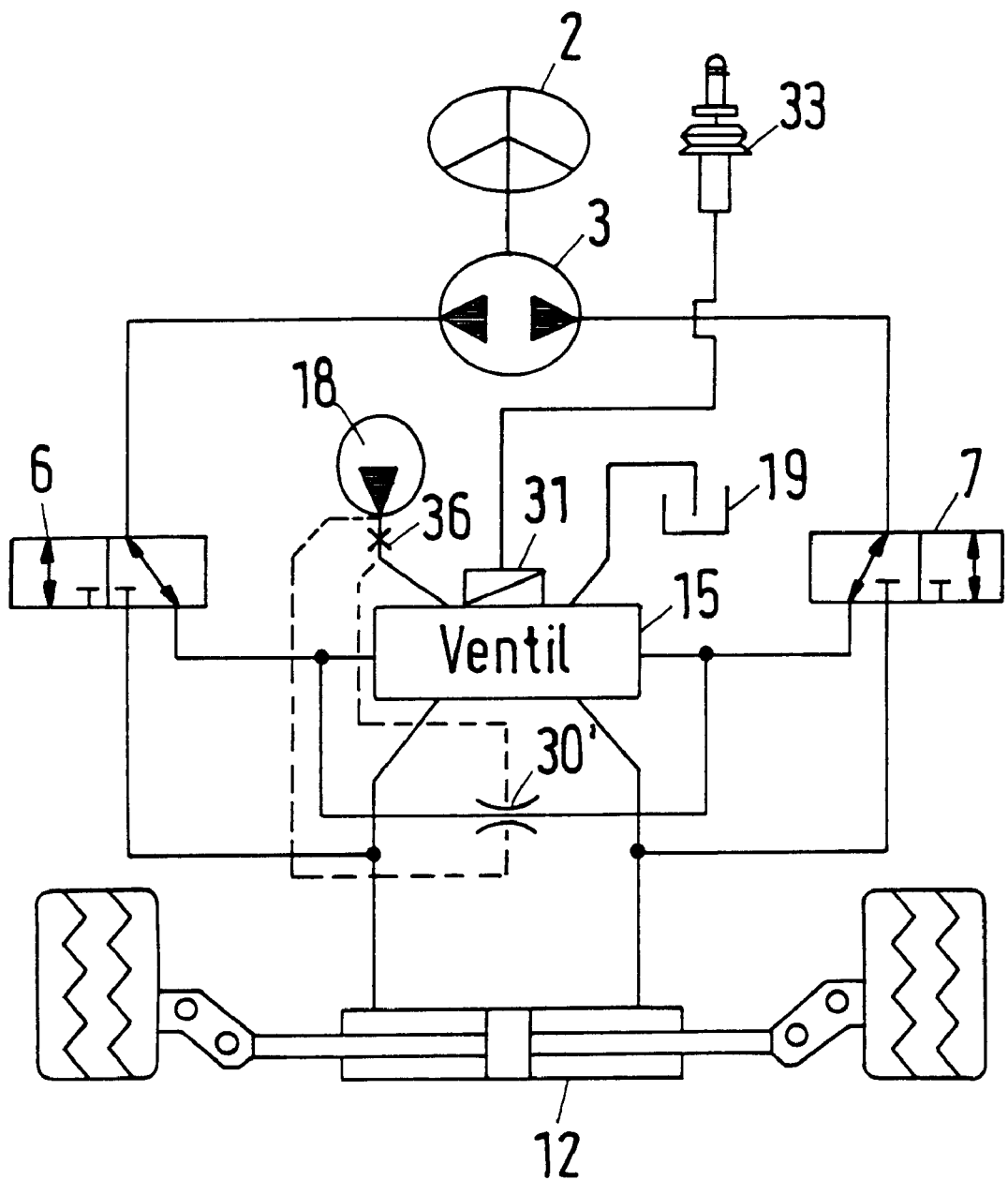

In the following the invention is described on the basis of preferred embodiments in connection with the drawings, showing:

FIG. 1 a first embodiment of a steering arrangement
FIG. 2 a second embodiment of a steering arrangement
FIG. 3 a third embodiment of a steering arrangement A hydraulic steering arrangement 1 according to FIG. 1 has a steering handwheel 2, which is connected with a manual pump 3. A turning of the steering handwheel 2 causes the manual pump 3 to supply hydraulic fluid into the lines 4, 5 connected to its two sides or outlets. Turning the steering handwheel, for example to the right, will cause hydraulic fluid to be pumped into the line 4 and drawn in by the line 5. When the steering handwheel 2 is turned in the other direction, the flow of hydraulic fluid is reversed. In this connection, the term "manual pump" is functional. In most cases, a hydraulic pump will in fact be concerned, which is operated by the steering handwheel 2. In principle, however, what matters is that an outlet flow is produced as a function of a rotation. This means that a dependency, for example proportionality, between rotation or rotation speed and flow is required. An ordinary hydraulic steering unit can also be used as manual pump 3.

The line 4 is connected with an additional valve 6. The line 5 is connected with an additional valve 7. The additional valves 6, 7 are only shown schematically. Their function will be explained later.

Via a line 8 the additional valve 6 is connected with a pressure chamber 10, and via a line 9 the additional valve 7 is connected with a pressure chamber 11, of a steering motor 12. The steering motor 12 controls the wheels 13, 14.

The steering motor 12 is also connected with a steering valve 15, namely via lines 16, 17. The steering valve 15 is connected with a pump 18 and a tank 19. The pump 18 can for example be driven by the motor of the steered vehicle.

The steering valve 15 has a valve slide 20, which is displaceable by means of hydraulic pressures on the steering connections 21, 22. For this purpose the steering connection 21 is connected with the additional valve 6 via a line 23, and the steering connection 22 is connected with the additional valve 7 via a line 24. Additionally, restoring springs 25, 26 act on the valve slide 20. Other valve elements can be used instead of a valve slide.

Either a connection between the pump 18 and the pressure chamber 10 or the pressure chamber 11 and the tank 19, respectively, or a connection between the pump 18 and the pressure chamber 11 or the pressure chamber 10 and the tank 19, respectively, will occur in dependence of the position of the valve slide 20. As long as the pump 18 is connected with a pressure chamber, the steering motor is operated and the wheels 13, 14 are controlled.

In the position shown, the additional valves 6, 7 connect the manual pump with the control connections 21, 22 of the steering valve 15. This position is obtained in that the pump 18 is connected with the control connections 45, 46 of the additional valves 6, 7, so that the valve elements of the additional valves 6, 7 are displaced to the position shown, for as long as the pump 18 produces the required pressure. In the opposite direction the valve elements of the additional valves 6, 7 are loaded by springs 27, 28. Thus the pump pressure of the pump 18 must provide a larger force than the springs 27, 28. When the pump pressure gets so low that the force of the springs 27, 28 exceeds this pressure, the additional valves 6, 7 are connected so that via the lines 4, 8 or 5, 9, respectively, the manual pump acts direct on the steering motor 12. The function of the additional valves 6, 7 can also be realised through an arrangement of direction valves or non-return valves.

The two control connections 21, 22 of the steering valve 15 are connected with each other via a line 29, an orifice 30 being arranged in the line. When, in the shown position of the additional valves 6, 7, the steering handwheel 2 is turned, the manual pump 3 supplies hydraulic fluid via the lines 4, 23, 29, 24, 5 in a circuit. This gives a pressure drop over the orifice 30, which leads to a pressure difference between the control connections 21, 22 of the steering valve 15, thus displacing the valve slide 20. As long as the steering handwheel is turned and there is a flow of hydraulic fluid in the circuit, the valve slide 20 remains displaced so that the pump 18 can submit one of the two pressure chambers 10, 11 to pressure. As soon as the turning of the steering handwheel 2 stops, the slide 20 returns to its neutral position, and the wheels 13, 14 remain in the set position. To obtain a returning of the wheels 13, 14, the steering handwheel 2 must then be turned in the other direction. When the steering valve 15 is in its neutral position and the additional valves 6, 7 are in the position shown, the pressure chambers 10, 11 are closed and the pump 18 supplies direct to the tank 19. This is an "open-centre" system. With the corresponding adaptations, however, also "closed-centre" and other systems can be used.

Now, an additional drive 31 for the valve slide 20 is provided, which acts on the valve slide 20 via for example a mechanical connection 32. The additional drive 31 can be operated via an external controller, for example a joystick 33. There are several opportunities with regard to the embodiment of the drive 31. It could for example be an electric motor acting on the valve slide via a rack. However, in most cases an electrohydraulic drive will be chosen, in which a hydraulic pressure is used to move the drive. This hydraulic pressure can for example be set through solenoid valves, particularly duty cycle controlled solenoid valves. In all cases, however, it is provided that the force exerted on the slide 20 by the additional drive 31 is smaller than the force produced by the hydraulic pressures of the manual pump 3. Thus, the control of the slide 20 via the steering handwheel 2 always has first priority.

FIG. 1 shows the drive 31 arranged on one side of the steering valve 15. Of course, it is also possible to arrange two drive parts, one on each side of the steering valve 15. The exact embodiment of the drive 31 is of no importance. Decisive is that the drive 31 acts on the slide 20, on which also the manual pump 3 acts. Also on failure of the steering system operating the drive 31, a functioning of the steering arrangement 1 is provided via the hydraulics.

FIG. 2 shows a modified embodiment in which the same parts have the same reference numbers as in FIG. 1.

One modification concerns the arrangement of the additional drive 31, which is now arranged in a different place, for example it can also act on the centre of the valve slide.

A sensor 34 has been inserted, which senses the angle position of the steering handwheel 2 and reports it to a control unit 35, to which also the joystick 33 is connected. The control unit 35 is thus connected with the additional drive 31.

Not only the angle position of the steering handwheel 2 can be determined by means of the sensor 34 and the control unit 35, but for example also the speed, with which the steering handwheel 2 is turned. If the steering speed then exceeds a predetermined value, the additional drive 31 can influence the steering valve 15 to reduce the steering speed again. This is particularly advantageous in connection with articulated vehicles, as here a high steering speed would cause inconvenient transversal accelerations on the driver.

Another opportunity of influence through the control unit 35 is that in principle any desired transfer function can be produced between the moving of the steering handwheel 2 and the moving of the steering motor 12. If required, the transfer function can also be made in dependence of speed or ground. The transfer function can also be a constant function.

Of course, sensors can also be placed elsewhere in the steering arrangement, for example on the wheels, to enable a failure monitoring. For example it can be monitored, if the wheels are really moving, when the steering handwheel 2 is turned. It can also be determined, if the steering motor 12 moves, even though there is no operation of the steering handwheel 2 or the joystick.

FIG. 3 shows a third embodiment, in which parts corresponding to those in FIGS. 1 and 2 have the same reference numbers. For reasons of clarity, a connection between the pump 18 and the additional valves 6, 7 is omitted.

The embodiment in FIG. 3 shows that the orifice 30' has a variable and adjustable flow resistance. Thus, the reaction of the steering valve 15 can be changed by operating the steering handwheel 2. If the orifice 30' has a large flow resistance, the pressure drop on a turning of the steering handwheel 2 is correspondingly large, and the displacement of the slide 20 in the steering valve 15 will be correspondingly large. Thus, even a small turning of the steering handwheel 2 causes a large displacement of the steering motor 12.

If, on the other hand, the flow resistance through the orifice 30' is made small, only a small pressure drop will occur, resulting in a correspondingly small pressure difference over the control valve 15, meaning that a similar turning of the steering handwheel 2 will give a correspondingly smaller displacement of the steering motor 12.

For the control of the orifice 30', a throttle 36 can be inserted in the line between the pump 18 and the steering valve 15, the orifice 30' being controlled so that the pressure drop over the throttle 36 and over the orifice 30' always remains the same. This gives a proportionality between the control flow over the orifice 30' and the pilot flow over the throttle 36. Other control philosophies for the orifice 30' are also possible. In this way it can be provided that, by means of a flow amplifier as shown, a sufficient amount of hydraulic fluid will always reach the steering motor 12, and a corresponding steering philosophy can be followed, that is the point of impact of the wheels 13, 14 depending on the turning of the steering handwheel 2.

In all three embodiments, the steering motor 12 can of course be operated by means of the joystick, which then acts direct on the additional drive 31.

In all three embodiments, additional function groups can be used in addition to the principal embodiment shown, for example a servostep or a servovalve, so that the steering valve 15 is activated by an amplified flow. For this purpose both the servovalve and the steering valve 15 can additionally be controlled electrically or hydraulically.

What is claimed is:

1. Hydraulic steering arrangement comprising a steering handwheel which is connected to a manual pump, a pump for supplying hydraulic fluid, a steering motor, a steering valve arranged between the pump and the steering motor and having a valve element for controlling the flow of hydraulic fluid between the pump and the steering motor, means connecting the valve element to the manual pump so that the valve element is displaceable by hydraulic energy originating from the manual pump, and including an additional drive for displacing the valve element, and including means to control the additional drive such that the manual pump exerts larger force on the valve element than the additional drive.

2. Steering arrangement according to claim 1, in which the additional drive is electrically controllable.

3. Steering arrangement according to claim 2, in which the additional drive works electrohydraulically.

4. Steering arrangement according to claim 1, in which the additional drive is connected to a control arrangement, which is connected to an external controller.

5. Steering arrangement according to claim 1, in which the steering arrangement is connected to a sensor monitoring a variable size of the steering arrangement.

6. Steering arrangement according to claim 5, in which the sensor is a steering handwheel sensor.

7. Steering arrangement according to claim 1, in which the manual pump is arranged in a circuit with an orifice arrangement having at least one orifice, the orifice arrangement being connected with actuating connections of the steering valve and arranged in parallel with the steering valve.

8. Steering arrangement according to claim 7, in which the orifice has an adjustable size.

9. Steering arrangement according to claim 8, in which a throttle is provided in a flow path between pump and steering motor, and the orifice is controlled so that the relation between the pressure drops over the orifice and the throttle follow a predetermined function.

10. Steering arrangement according to claim 9, in which the relation is constant.

11. Steering arrangement according to claim 1, in which an additional valve arrangement is located between the manual pump and the steering valve, the additional valve arrangement connecting the manual pump with either the steering valve or, when pump pressure drops below a predetermined value, with the steering motor.

12. Steering arrangement according to claim 11, in which the additional valve arrangement has an additional valve element arrangement, whose steering inlet is connected to the pump.

13. Steering arrangement according to claim 11, in which the additional valve arrangement comprises an additional valve on either side of the manual pump.

* * * * *